United States Patent
Ko et al.

(10) Patent No.: US 11,130,152 B2
(45) Date of Patent: Sep. 28, 2021

(54) METHOD FOR THE FORMATION OF TANTALUM CARBIDES ON GRAPHITE SUBSTRATE

(71) Applicant: National Chung-Shan Institute of Science and Technology, Taoyuan (TW)

(72) Inventors: Cheng-Jung Ko, New Taipei (TW);
Jun-Bin Huang, Taoyuan (TW);
Chih-Wei Kuo, Hsinchu (TW);
Dai-Liang Ma, Taoyuan (TW);
Bang-Ying Yu, Taoyuan (TW)

(73) Assignee: National Chung-Shan Institute of Science and Technology, Taoyuan (TW)

( * ) Notice: Subject to any disclaimer, the term of this patent is extended or adjusted under 35 U.S.C. 154(b) by 81 days.

(21) Appl. No.: 16/699,093

(22) Filed: Nov. 28, 2019

(65) Prior Publication Data

US 2021/0162453 A1 Jun. 3, 2021

(51) Int. Cl.
*B05D 1/18* (2006.01)
*B05D 1/02* (2006.01)
(Continued)

(52) U.S. Cl.
CPC .............. *B05D 1/18* (2013.01); *B05D 1/02* (2013.01); *B05D 3/0272* (2013.01);
(Continued)

(58) Field of Classification Search
CPC ...... C23C 18/02; C23C 18/1204; C01G 35/00
See application file for complete search history.

(56) References Cited

U.S. PATENT DOCUMENTS 3,809,565 A * 5/1974 Wewerka et al. ... C04B 35/5622
501/87
4,196,230 A * 4/1980 Gibson .................. B29C 70/24
427/228

(Continued)

FOREIGN PATENT DOCUMENTS

CN 106298448 A 1/2017
JP 2011-153070 A 8/2011
(Continued)

OTHER PUBLICATIONS

Xiang et al., "Synthesis and microstructure of tantalum carbide and carbon composite by liquid precursor route," 2006, Scripta Materialia 55, pp. 339-342. (Year: 2006).*

(Continued)

*Primary Examiner* — Robert A Vetere
(74) *Attorney, Agent, or Firm* — Winston Hsu

(57) ABSTRACT

A method for the formation of tantalum carbides on a graphite substrate includes the steps of: (a) adding an organic tantalum compound, a chelating agent, a pre-polymer to an organic solvent to form a tantalum polymeric solution; (b) subjecting a graphite substrate with the tantalum polymeric solution to a curing process to form a polymeric tantalum film on the graphite substrate; and (c) subjecting the polymeric tantalum film on the graphite substrate in an oven to a pyrolytic reaction in the presence of a protective gas to obtain a protective tantalum carbide on the graphite substrate.

13 Claims, 4 Drawing Sheets

(51) Int. Cl.
  *B05D 3/02*    (2006.01)
  *C01G 35/00*   (2006.01)
  *C23C 18/02*   (2006.01)
  *C23C 18/12*   (2006.01)
  *B05D 3/04*    (2006.01)

(52) U.S. Cl.
  CPC ........... *B05D 3/0453* (2013.01); *C01G 35/00* (2013.01); *C23C 18/02* (2013.01); *C23C 18/1204* (2013.01); *B05D 2505/50* (2013.01); *B05D 2518/00* (2013.01); *B05D 2601/28* (2013.01)

(56) References Cited

U.S. PATENT DOCUMENTS

| | | | |
|---|---|---|---|
| 4,560,589 A * | 12/1985 | Endou | C04B 41/009 427/249.15 |
| 6,328,947 B1 * | 12/2001 | Monden | B82Y 30/00 423/608 |
| 8,216,667 B2 | 7/2012 | Fujiwara | |
| 9,315,921 B2 | 4/2016 | Nakamura | |
| 9,322,113 B2 | 4/2016 | Kondo | |
| 2002/0130216 A1 * | 9/2002 | Facciano | F02K 9/90 244/3.24 |
| 2007/0077164 A1 * | 4/2007 | Hammond | B22F 3/1039 419/29 |

FOREIGN PATENT DOCUMENTS

| | | |
|---|---|---|
| JP | 2013-75814 A | 4/2013 |
| JP | 2018-145022 A | 9/2018 |
| JP | 2019-99453 A | 6/2019 |
| WO | 2006/085635 A1 | 8/2006 |

OTHER PUBLICATIONS

Thorne et al., "Synthesis of SiC/TaC ceramics from tantalum alkoxide modified polycarbosilane," 1991, J. Mater. Res., vol. 6, No. 10, pp. 2199-2207. (Year: 1991).*

* cited by examiner

METHOD FOR THE FORMATION OF TANTALUM CARBIDES ON GRAPHITE SUBSTRATE

BACKGROUND OF THE INVENTION

1. Field of the Invention

The present invention generally relates to a method for the formation of tantalum carbides on a graphite substrate. In particular, the present invention is directed to a method for the formation of tantalum carbides on a graphite substrate from a mixture of an organic tantalum compound, a chelating agent, a pre-polymer, optional less expensive tantalum powders and an organic solvent to obtain a protective tantalum carbide film with a thickness of 40 μm to 250 μm on the graphite substrate in the absence of a tantalum halide compound to be an environment-friendly green method.

2. Description of the Prior Art

Tantalum carbide has known to have excellent physical properties such as high wear resistance, high resistance to chemicals and to impact. It may be applied to be the protective layer of graphite crucibles to prevent the diffusion of impurities from entering the graphite crucibles, from contaminating the wafer, to increase the graphite crucible service life and to reduce manufacturing costs due to the characteristics of being dense and not easily diffused through.

Since the environmental conditions for the growth of single crystal silicon carbide and aluminum nitride is 1800° C.-2300° C., it is important to prepare a graphite protective layer with excellent physical properties such as high wear resistance, high temperature resistance, high chemical resistance and high impact resistance. It is known that the preparation of tantalum carbide by the CVD method produces hydrochloric acid as a by-product which has an adverse effect on the human body and the environment. Further, the use of slurry containing tantalum carbide micron particles for the preparation of a tantalum carbide coating is also relatively expensive.

SUMMARY OF THE INVENTION

In view of the above disadvantages of prior art, one objective of the present invention is to provide a method for the formation of tantalum carbides on a graphite substrate. The present invention can solve the shortcomings of conventional manufacturing methods, and has the advantages of not using a tantalum halide compound as the tantalum source. Because the formation of the tantalum carbides is carried out in the absence of a tantalum halide compound, no hazardous hydrogen halide is resultantly generated to pollute the air. Further, the obtained protective tantalum carbide film on the graphite substrate may be as thick as possible, for example 40 μm to 250 μm, so as to be a practically robust and ideal protective film for use in the protection of the graphite substrate.

In order to achieve the above objectives, a method for the formation of tantalum carbides on a graphite substrate is provided. The method includes at least the steps of:
(A) providing an organic tantalum compound;
(B) adding the organic tantalum compound to a chelating agent to form a chelated tantalum compound;
(C) adding the chelated tantalum compound to an organic solvent to form a tantalum solution;
(D) adding a pre-polymer to the tantalum solution to form a tantalum polymeric solution;
(E) applying the tantalum polymeric solution onto a graphite substrate;
(F) subjecting the graphite substrate with the tantalum polymeric solution to a curing process to form a polymeric tantalum film on the graphite substrate;
(G) placing the polymeric tantalum film on the graphite substrate in an oven; and
(H) subjecting the polymeric tantalum film on the graphite substrate in the oven to a pyrolytic reaction in the presence of a protective gas to obtain a protective tantalum carbide on the graphite substrate.

In the step (A) of the above method, the organic tantalum compound is a liquid organic tantalum source. For example the liquid organic tantalum source is selected from a group consisting of tantalum methoxide, tantalum ethoxide, tantalum isopropoxide and tantalum butoxide.

In the step (B) of the above method, the chelating agent may be acetylacetone.

In the step (C) of the above method, the organic solvent is selected from a group consisting of methylpyrrolidone and dimethylacetamide, and the chelating agent helps the organic tantalum source uniformly dissolved in the organic solvent.

In the step (D) of the above method, the pre-polymer is selected from a group consisting of phenolic resins, polyimide and furfural resin. The pre-polymer preferably has higher residue carbon content after the pyrolytic reaction.

Before applying the tantalum polymeric solution onto the graphite substrate, tantalum powders may be added to the tantalum polymeric solution. The tantalum powders may have a particle size not greater than 30 μm and a weight of 20% to 50% of a total weight of the tantalum polymeric solution with the tantalum powders. The tantalum powders are selected from a group consisting of tantalum metal powders and tantalum oxide powders.

In the step (E) of the above method, the tantalum polymeric solution may be applied onto a graphite substrate by dip coating or spray coating.

In the step (F) of the above method, the curing process may be carried out at a temperature of 120° C.-450° C. for 1 hour to 3 hours. For example, for the phenolic resins, the curing process may be carried out at a temperature of 120° C.-200° C. for 1 hour to 2 hours. For polyimide, the curing process may be carried out at a temperature of 250° C.-450° C. for at least 3 hours till the IR spectrum shows the asymmetric and symmetric carbonyl stretch of the imide ring at 1778 and 1720 $cm^{-1}$ and the C—N stretch at 1380 $cm^{-1}$ are characteristic of the polyimide.

In the step (G) of the above method, placing the polymeric tantalum film on the graphite substrate in an oven facilitates the subsequent pyrolytic reaction.

In the step (H) of the above method, the pyrolytic reaction may be carried out at a temperature of 2000° C.-2300° C. for 12 hour to 24 hours under a pressure of 50 torr-600 torr. The step (E) to step (H) may be repeatedly carried out 5 to 10 times.

In the step (H) of the above method, the protective gas may be selected from a group consisting of argon, helium and an argon/hydrogen mixture.

In the step (H) of the above method, the protective tantalum carbide is a film with a thickness of 40 μm to 250 μm.

These and other objectives of the present invention will no doubt become obvious to those of ordinary skill in the art

DETAILED DESCRIPTION

The embodiments of the present invention are described below by some specific examples, and those skilled in the art can readily appreciate the advantages and functions of the present invention from the disclosure of the specification.

Figure 1:
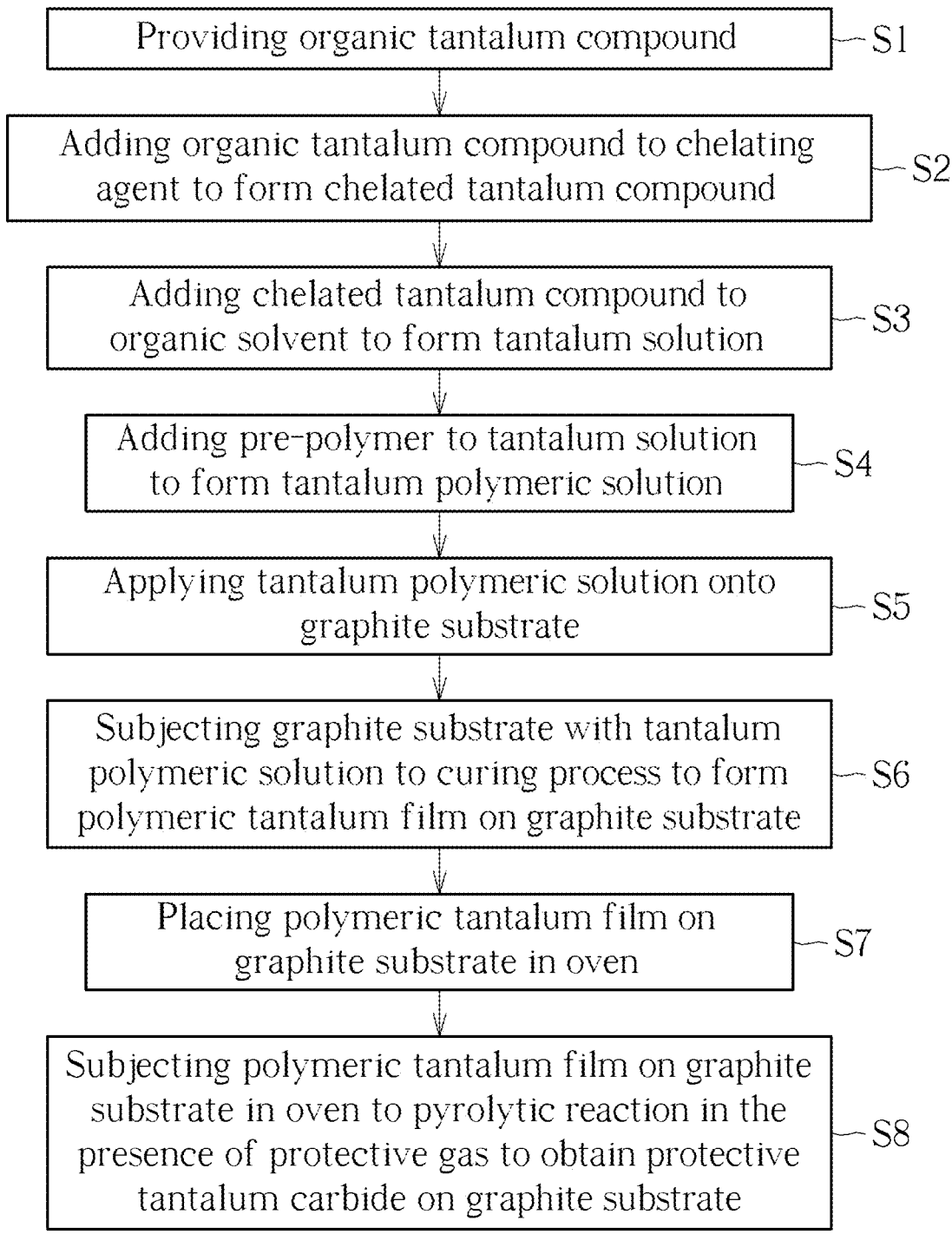
FIG. 1 is a flow chart of a method for the formation of tantalum carbides on a graphite substrate of the present invention.

Please refer to FIG. 1, which is a flow chart of a method for the formation of tantalum carbides on a graphite substrate of the present invention. As shown in the figure, the present invention provides a method for the formation of tantalum carbides on a graphite substrate. The method includes at least the following steps:

(S1) providing an organic tantalum compound;
(S2) adding the organic tantalum compound to a chelating agent to form a chelated tantalum compound;
(S3) adding the chelated tantalum compound to an organic solvent to form a tantalum solution;
(S4) adding a pre-polymer to the tantalum solution to form a tantalum polymeric solution;
(S5) applying the tantalum polymeric solution onto a graphite substrate;
(S6) subjecting the graphite substrate with the tantalum polymeric solution to a curing process to form a polymeric tantalum film on the graphite substrate;
(S7) placing the polymeric tantalum film on the graphite substrate in an oven; and
(S8) subjecting the polymeric tantalum film on the graphite substrate in the oven to a pyrolytic reaction in the presence of a protective gas to obtain a protective tantalum carbide on the graphite substrate.

The organic tantalum compound in the step (S1) of the present invention provides the tantalum source for the formation of tantalum carbides on a graphite substrate. The organic tantalum compound may be a liquid organic tantalum source for the fabrication of tantalum carbides. In particular, the liquid organic tantalum source is preferably miscible with the subsequent organic solvent. The organic tantalum compound, for example may be selected from a group consisting of tantalum methoxide, tantalum ethoxide, tantalum isopropoxide and tantalum butoxide, but the present invention is not limited to these.

The chelating agent in the step (S2) of the present invention facilitates the organic tantalum compound to be miscible with the subsequent organic solvent. The molar ratio of the chelating agent to the organic tantalum compound may be at least 1:1, and preferably greater than 1:1, for example 5:1, but the present invention is not limited to these. The chelating agent may be acetylacetone for example, but the present invention is not limited to these.

The organic solvent in the step (S3) of the present invention helps all reagents form a homogenous solution to facilitate the subsequent reactions so the chelated tantalum compound is dissolved in the organic solvent to form a tantalum solution. The weight ratio of the chelated tantalum compound to the organic solvent may be 1:1 to 1:4, but the present invention is not limited to these. The organic solvent may be selected from a group consisting of methanol, ethanol, isopropanol, methylpyrrolidone and dimethylacetamide, but the present invention is not limited to these.

The pre-polymer in the step (S4) of the present invention may provide the tantalum carbide with the carbon source so the pre-polymer may preferably have higher residue carbon content after the pyrolytic reaction. The pre-polymer may be selected from a group consisting of phenolic resins, polyimide and furfural resin, but the present invention is not limited to these. The pre-polymer may be provided in the form of a solution. For example, the pre-polymer may be phenolic resins in 40%-60% ethanol solution, or polyimide in 20%-80% dimethylacetamide solution. The tantalum polymeric solution is preferably a homogenous solution.

Optionally, tantalum powders may be additionally added to the tantalum polymeric solution (S4-1) before (S5) applying the tantalum polymeric solution onto the graphite substrate. The tantalum powders may serve as an additional tantalum source and have a particle size not greater than 30 μm, preferably about 10 μm, but the present invention is not limited to these. The tantalum powders may have a weight ratio of 20% to 50% of a total weight of the tantalum polymeric solution with the tantalum powders, but the present invention is not limited to these.

The additional tantalum powders may be advantageous in providing more premium tantalum source and in increasing the thickness of the resultant protective tantalum carbide film on the graphite substrate. The tantalum powders may be a tantalum-containing inorganic material, for example, selected from a group consisting of tantalum metal powders and tantalum oxide powders, but the present invention is not limited to these. In other words, the tantalum polymeric solution may have additional tantalum powders or not.

Next, in the step (S6) the graphite substrate with the tantalum polymeric solution is subjected to a curing process. The curing process is used to cure the liquid tantalum polymeric solution so as to form a solid polymeric tantalum film on the graphite substrate. The curing process is carried out at a suitable temperature. For example, if the phenolic resins are present, the curing process may be carried out at a temperature of 120° C.-200° C., preferably about 180° C., for 1 hour to 2 hours, but the present invention is not limited to these. If the polyimide is present, the curing process may be carried out at a temperature of 250° C.-450° C., preferably about 300° C., for at least 3 hours till the IR spectrum shows the asymmetric and symmetric carbonyl stretch of the imide ring at 1778 and 1720 cm$^{-1}$ and the C—N stretch at 1380 cm$^{-1}$ are characteristic of the polyimide, but the present invention is not limited to these.

The oven in the step (S7) of the present invention may preferably provide the polymeric tantalum film on the graphite substrate with sufficient thermal energy to carry out the predetermined pyrolytic reaction. The polymeric tantalum film on the graphite substrate in the step (S8) of the present invention is then subjected to the pyrolytic reaction. Pyrolysis is a thermo-chemical reaction to undergo a thermal decomposition. The pyrolytic reaction helps the tantalum source and the carbon source in the polymeric tantalum film initiate the expected chemical synthesis reaction to yield a more concentrated tantalum-carbon mixture from the tantalum source and form the carbon source.

A suitable thermal condition may facilitate the pyrolytic reaction to obtain robust tantalum carbide by reaching a thermal cracking degradation temperature to decompose the molecules to elements. In other words, the pyrolytic reaction may be carried out in the presence of a suitable thermal condition. For example, the pyrolytic reaction may be carried out at a temperature of 2000° C.-2300° C., preferably about 2100° C., in the oven to provide the pyrolytic reaction with sufficient energy to concentrate the tantalum source and the carbon source, but the present invention is not limited to these. Further, the pyrolytic reaction may be carried out for 12 hour to 24 hours under a pressure of 50 torr-600 torr, but the present invention is not limited to these. In one embodiment of the present invention, the step (S5) to step (S7) may be repeatedly carried out 5 to 10 times, but the present invention is not limited to these.

The pyrolytic reaction in the step (S8) of the present invention may be carried out in the presence of a protective gas. The protective gas may be an inert gas, for example selected from a group consisting of argon, helium and an argon/hydrogen mixture, but the present invention is not limited to these.

Figure 2:
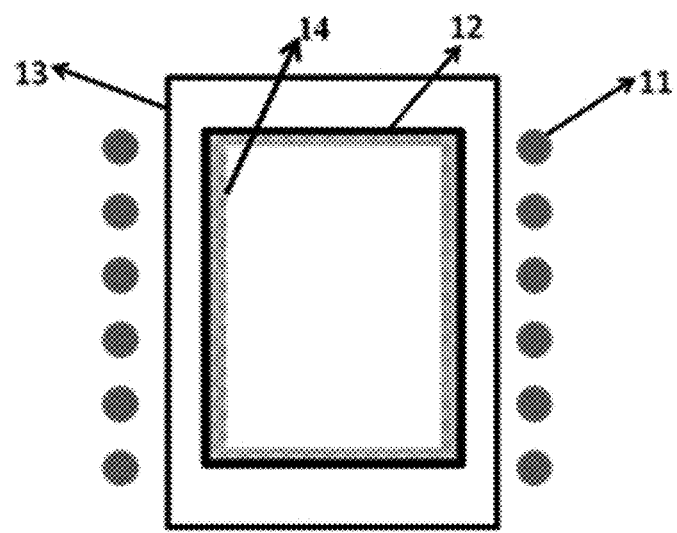
FIG. 2 illustrates a schematic diagram of the tantalum carbide film disposed on a graphite substrate in an oven of the present invention.

After the pyrolytic reaction, a resultant protective tantalum carbide film is formed on the graphite substrate. Please refer to FIG. 2, which illustrates a schematic diagram of the tantalum carbide film disposed on a graphite substrate in an oven of the present invention. As shown in FIG. 2, the graphite crucible 12 with the tantalum carbide film 14 disposed on its surface is in an oven 13. The heat sources 11 are used to carry out the determined pyrolytic reaction.

The protective tantalum carbide film 14 on the graphite crucible 12 may have a thickness of about 40 μm to 250 μm, but the present invention is not limited to these. For example, if the tantalum powders are used, the protective tantalum carbide film 14 may have a thickness up to 250 μm. Alternatively, if the tantalum powders are not used, the protective tantalum carbide film 14 may have a thickness up to 40 μm.

Figure 3:
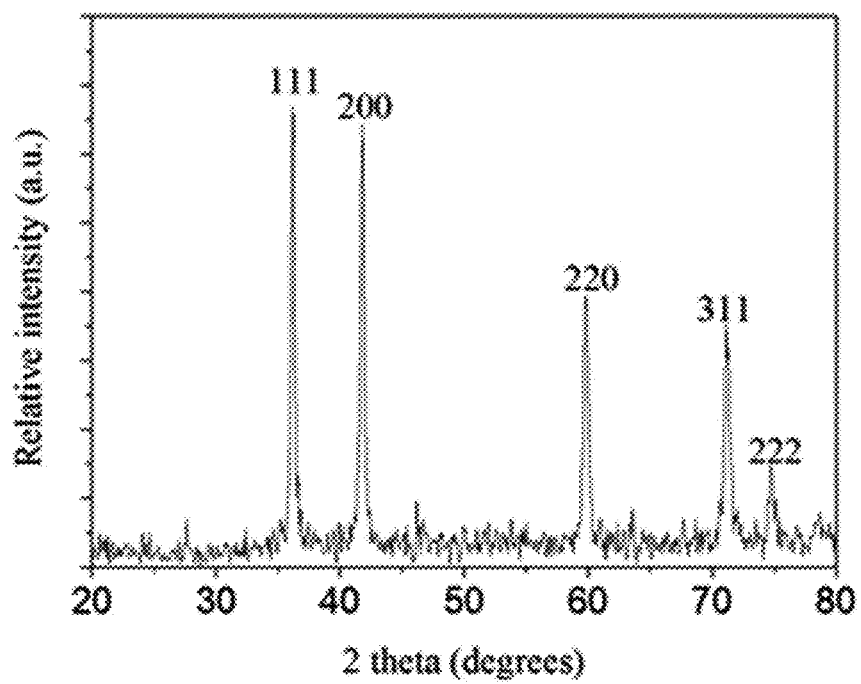
FIG. 3 illustrates an XRD pattern of the tantalum carbide film which is made from tantalum ethoxide and phenolic resins in the absence of tantalum powders on a graphite substrate according to the method for the formation of tantalum carbides on a graphite substrate of the present invention.

Please refer to FIG. 3, which illustrates an XRD pattern of the tantalum carbide film which is made from tantalum ethoxide and phenolic resins in the absence of tantalum powders on a graphite substrate according to the method for the formation of tantalum carbides on a graphite substrate of the present invention. It is observed in FIG. 3 that no sign (26.5°) of graphite (002) to prove that the resultant tantalum carbide film completely covers the surface of the graphite substrate.

Figure 4:
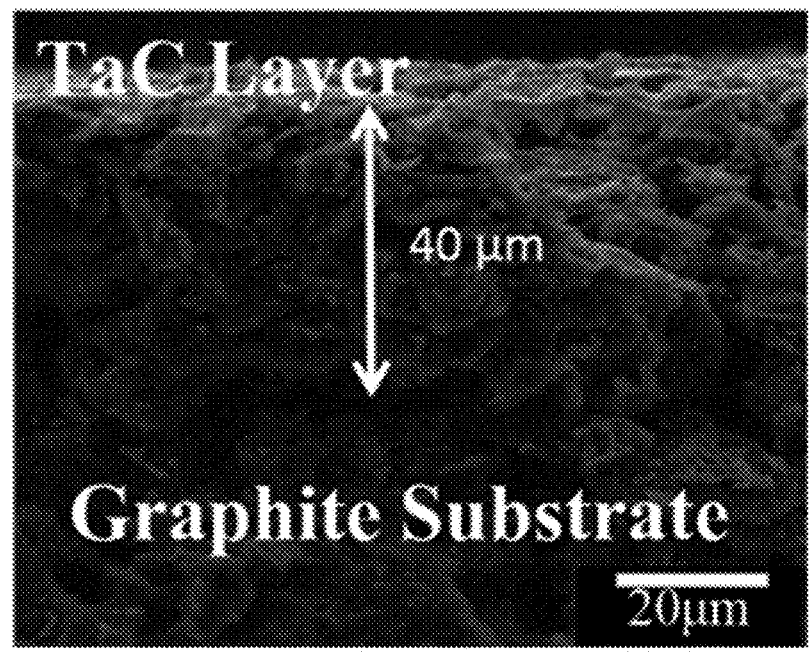
FIG. 4 illustrates an SEM image of the tantalum carbide film which is made from tantalum ethoxide and phenolic resins in the absence of tantalum powders on a graphite substrate according to the method for the formation of tantalum carbides on a graphite substrate of the present invention.

FIG. 4 illustrates an SEM image of the tantalum carbide film which is made from tantalum ethoxide and phenolic resins in the absence of tantalum powders on a graphite substrate according to the method for the formation of tantalum carbides on a graphite substrate of the present invention. FIG. 4 shows that the protective tantalum carbide film may have a thickness of 40 μm.

Figure 5:
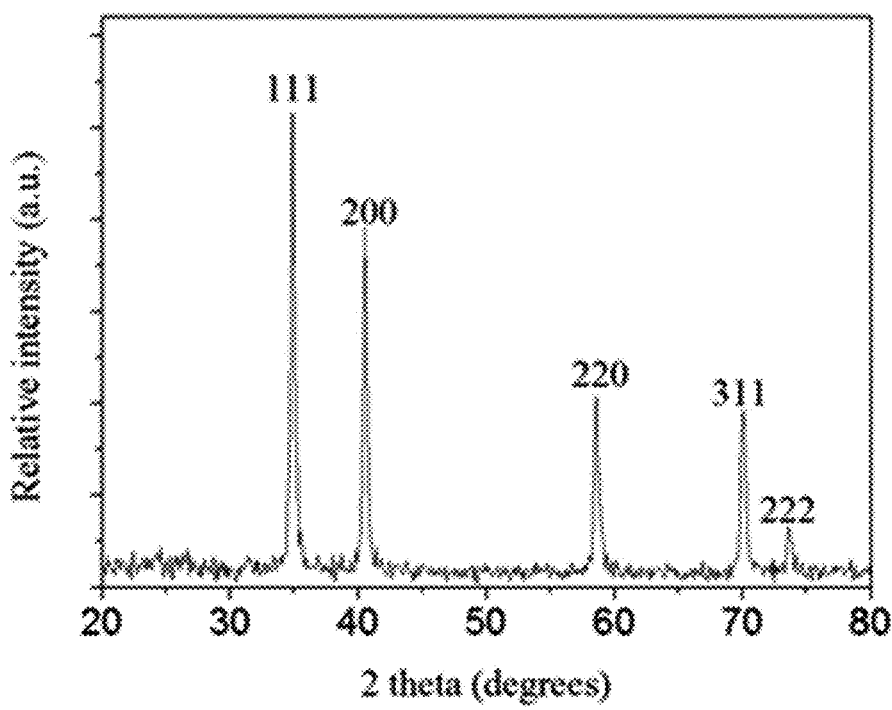
FIG. 5 illustrates an XRD pattern of the tantalum carbide film which is made from tantalum ethoxide and phenolic resins in the presence of additional tantalum powders on a graphite substrate according to the method for the formation of tantalum carbides on a graphite substrate of the present invention.

Please refer to FIG. 5, which illustrates an XRD pattern of the tantalum carbide film which is made from tantalum ethoxide and phenolic resins in the presence of additional tantalum powders on a graphite substrate according to the method for the formation of tantalum carbides on a graphite substrate of the present invention. It is observed in FIG. 5 that no sign(26.5°) of graphite (002) to prove that the resultant tantalum carbide film completely covers the surface of the graphite substrate.

Figure 6:
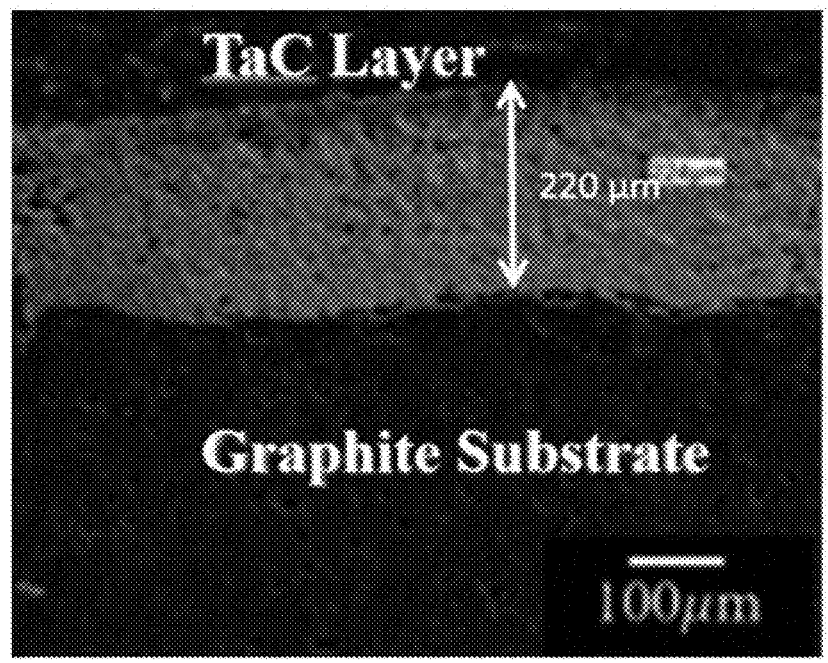
FIG. 6 illustrates an SEM image of the tantalum carbide film which is made from tantalum ethoxide and phenolic resins in the presence of additional tantalum powders on a graphite substrate according to the method for the formation of tantalum carbides on a graphite substrate of the present invention.

FIG. 6 illustrates an SEM image of the tantalum carbide film which is made from tantalum ethoxide and phenolic resins in the presence of additional tantalum powders on a graphite substrate according to the method for the formation of tantalum carbides on a graphite substrate of the present invention. FIG. 6 shows that the protective tantalum carbide film may have a greater thickness up to 220 μm.

In particular, the protective tantalum carbide film in FIG. 6 shows a greater thickness than that in FIG. 5. It is suggested that in FIG. 4 the tantalum carbide is basically converted from tantalum ethoxide to have a relatively uniform particle size so it is less easy to be densely packed. However, after the addition of tantalum powders, smaller particles of the tantalum powders may fill the gaps amongst larger particles of the tantalum powders due to the difference in particle size to yield a denser and thicker protective tantalum carbide layer.

The method for the formation of tantalum carbides on a graphite substrate of the present invention may have one or more advantages and unexpected results, such as:

(1) The present invention utilizes an alkoxide of tantalum or additional less expensive tantalum powders (less expensive than tantalum carbide powders) to be mixed and coated with a pre-polymer so that the tantalum-containing organic compound or tantalum powder is converted into tantalum carbides at a high temperature. In additional to the carbon source provided by the graphite substrate, the pre-polymer may also serve a carbon source to react with the tantalum alkoxide or tantalum powder at a high temperature to form a robust and thick tantalum carbide film on the graphite substrate; and (2) moreover, the robust and thick tantalum carbide film prepared by the present invention may be tightly attached the graphite substrate to form a substrate protective layer for the growth of silicon carbide single crystal.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for the formation of tantalum carbides on a graphite substrate, comprising:
   (A) providing an organic tantalum compound;
   (B) adding the organic tantalum compound to a chelating agent to form a chelated tantalum compound;
   (C) adding the chelated tantalum compound to an organic solvent to form a tantalum solution;
   (D) adding a pre-polymer to the tantalum solution to form a tantalum polymeric solution;

(E) applying the tantalum polymeric solution onto a graphite substrate;
(F) subjecting the graphite substrate with the tantalum polymeric solution to a curing process to form a polymeric tantalum film on the graphite substrate;
(G) placing the polymeric tantalum film on the graphite substrate in an oven; and
(H) subjecting the polymeric tantalum film on the graphite substrate in the oven to a pyrolytic reaction in the presence of a protective gas to obtain a protective tantalum carbide on the graphite substrate.

2. The method for the formation of tantalum carbides on a graphite substrate of claim 1, wherein the organic tantalum compound is a liquid organic tantalum source.

3. The method for the formation of tantalum carbides on a graphite substrate of claim 2, wherein the liquid organic tantalum source is selected from a group consisting of tantalum methoxide, tantalum ethoxide, tantalum isopropoxide and tantalum butoxide.

4. The method for the formation of tantalum carbides on a graphite substrate of claim 1, wherein the organic solvent is selected from a group consisting of methylpyrrolidone and dimethylacetamide.

5. The method for the formation of tantalum carbides on a graphite substrate of claim 1, wherein the pre-polymer is selected from a group consisting of phenolic resins, polyimide and furfural resin.

6. The method for the formation of tantalum carbides on a graphite substrate of claim 1, further comprising:
adding tantalum powders to the tantalum polymeric solution before applying the tantalum polymeric solution onto the graphite substrate.

7. The method for the formation of tantalum carbides on a graphite substrate of claim 6, wherein the tantalum powders have a particle size not greater than 30 μm and a weight of 20% to 50% of a total weight of the tantalum polymeric solution with the tantalum powders.

8. The method for the formation of tantalum carbides on a graphite substrate of claim 6, wherein the tantalum powders are selected from a group consisting of tantalum metal powders and tantalum oxide powders.

9. The method for the formation of tantalum carbides on a graphite substrate of claim 1, wherein the curing process is performed at a temperature of 120° C.-450° C. for 1 hour to 3 hours.

10. The method for the formation of tantalum carbides on a graphite substrate of claim 1, wherein the pyrolytic reaction is performed at a temperature of 2000° C.-2300° C. for 12 hour to 24 hours under a pressure of 50 torr-600 torr.

11. The method for the formation of tantalum carbides on a graphite substrate of claim 1, wherein the pyrolytic reaction is performed 5 to 10 times.

12. The method for the formation of tantalum carbides on a graphite substrate of claim 1, wherein the protective gas is selected from a group consisting of argon, helium and an argon/hydrogen mixture.

13. The method for the formation of tantalum carbides on a graphite substrate of claim 1, wherein the protective tantalum carbide has a thickness of 40 μm to 250 μm.

* * * * *